US006696814B2

(12) United States Patent
Henderson et al.

(10) Patent No.: US 6,696,814 B2
(45) Date of Patent: Feb. 24, 2004

(54) MICROPROCESSOR FOR CONTROLLING THE SPEED AND FREQUENCY OF A MOTOR SHAFT IN A POWER TOOL

(75) Inventors: Jeffery L. Henderson, Somerville, AL (US); Hong Moon, Arab, AL (US); Mark Wardrup, Attalla, AL (US); Ivan Reede, Dollard des Ormeaux (CA)

(73) Assignee: Tyco Electronics Corporation, Middletown, PA (US)

( * ) Notice: Subject to any disclaimer, the term of this patent is extended or adjusted under 35 U.S.C. 154(b) by 192 days.

(21) Appl. No.: 09/901,353

(22) Filed: Jul. 9, 2001

(65) Prior Publication Data

US 2003/0047331 A1 Mar. 13, 2003

(51) Int. Cl.[7] ................................................ H02P 5/34
(52) U.S. Cl. .................. 318/811; 318/254; 318/138; 318/439; 318/807; 318/907.5
(58) Field of Search ....................... 318/811, 254, 318/138, 439, 807, 430, 432, 434, 490; 388/804, 811, 907.5, 931, 937, 904, 918, 916, 930

(56) References Cited

U.S. PATENT DOCUMENTS

| | | | |
|---|---|---|---|
| 5,731,673 A | 3/1998 | Gilmore | 318/432 |
| 5,923,145 A * | 7/1999 | Reichard et al. | 318/811 |
| 6,313,611 B1 * | 11/2001 | Mowry et al. | 320/136 |
| 6,392,373 B1 * | 5/2002 | Glasgow et al. | 318/430 |
| 6,424,799 B1 * | 7/2002 | Gilmore | 388/811 |

FOREIGN PATENT DOCUMENTS

| EP | 0 808 011 A1 | 11/1997 | .......... H02H/7/085 |
|---|---|---|---|

OTHER PUBLICATIONS

Search Report for International Application No. PCT/US02/18379, Mailed Sep. 27, 2002.

* cited by examiner

Primary Examiner—Karen Masih

(57) ABSTRACT

A control system for driving a power tool is provided comprising a power source, a motor adapted to drive a shaft, a power switching unit interconnecting the power source and the motor, and a controller. The power switching unit applying a pulse width modulated (PWM) drive signal from the power source to the motor. The controller monitoring at least one electrical characteristic of at least one of the power source, motor and power switching unit and adjusting the operating duty cycle of the PWM drive signal based on the electrical characteristics.

41 Claims, 3 Drawing Sheets

MICROPROCESSOR FOR CONTROLLING THE SPEED AND FREQUENCY OF A MOTOR SHAFT IN A POWER TOOL

BACKGROUND OF THE INVENTION

At least one embodiment of the present invention generally relates to variable speed power tools. More particularly at least one embodiment of the present invention relates to controlling the speed and frequency of electric motors in power tools.

Hand held power tools, such as electric drills screw drivers and the like, use electric motors to power a chuck holding a tool. Such power tools usually include a trigger which is manually operated by a user with the motor being controlled by the user pressing the trigger. Power tools in which the motor and chuck speed are varied based on the amount that the trigger is depressed are known as variable speed power tools. Power tools include motors that are powered by an AC or DC power source that delivers current to the motor. As the user squeezes the trigger, more power is delivered to the motor to cause the shaft to rotate faster. Once the trigger is released, current is no longer delivered to the motor.

Typically, power tools include speed control circuits that use pulse width modulation (PWM) to control the voltage applied to the motor. More specifically, the PWM control circuit rapidly cycles power on and off to the motor. The PWM control circuit controls the duty cycles based on the trigger position. The more the trigger is squeezed the larger the on-time duty cycle is and the faster the shaft rotates.

Power tools often experience high current or stalled conditions when a work load exceeds the capability of the motor or the battery. These conditions create extreme loads on the battery, motor and other electric components of the tool. These conditions also reduce the effectiveness of the tool by damaging the battery, motor and other electric components of the tool.

Conventional power tools exaggerate the negative effects of stalled conditions by including a by-pass contact that, when closed, by-passes the variable speed control. The by-pass contact is closed when the desired power output exceeds a certain point. When the by-pass contact closes, the tool directly connects the motor and battery to deliver all available power to the motor. Under certain conditions the use of a by-pass contact is undesirable because it may damage the battery, motor or other electrical components in the tool. The use of a by-pass contact therefore may lead to a reduced tool life and may also lead to a stalled motor condition.

A need exists for a control circuit that more effectively monitors the electrical condition of the power tool in determining the duty cycle. A need also exists for a control circuit that monitors the electrical conditions of the power tool in determining the frequency of the duty cycle. A need further exists for a power tool controller that provides a maximum amount of power to the motor without damaging the battery and that eliminates or reduces stalled motor conditions.

BRIEF SUMMARY OF THE INVENTION

In accordance with at least one embodiment of the present invention, a control system is provided for driving a power tool, comprising a power source, a motor adapted to drive a shaft, and a power switching unit interconnecting the power source and the motor. The power switching unit applies a pulse width modulated (PWM) drive signal from the power source to the motor. A controller monitors at least one electrical characteristic of at least one of the power source, motor and power switching unit, and adjusts an operating duty cycle of the PWM drive signal based on the electrical characteristic.

One aspect of another embodiment of the present invention is monitoring the voltage of the power source, the motor or the power switching unit. Optionally, the system may monitor the current of the power source, the motor or the power switching unit.

Another aspect of an embodiment of the present invention is the use of a controller that detects a voltage drop across the power source. Optionally, the controller detects a voltage drop across said power source and the motor.

In one embodiment of the present invention, the power switching unit comprises a power MOSFET connected in series between the power source and the motor. The power MOSFET switches between ON and OFF states to vary the pulse width of said PWM drive signal. Optionally, an input lead connected to the controller provides a user trigger signal indicative of a trigger position or a motor speed. Alternatively, the PWM drive signal adjusting the motor speed.

Another aspect of an embodiment of the present invention is the use of a voltage sensor to monitor a voltage drop across at least one of the power source, the motor and the controller. Optionally, the controller determines a target duty cycle representative of a target motor condition selected by a user and sets the operating duty cycle below the target duty cycle or at a value not equal to the target duty cycle. Optionally, the target motor condition may constitute the motor speed or torque. Alternatively, the operating duty cycle may be set from the peak current and time period over which the power source delivers a current at or near the peak current.

BRIEF DESCRIPTION OF THE DRAWINGS

The foregoing summary, as well as the following detailed description of the preferred embodiments of the present invention, will be better understood when read in conjunction with the appended drawings. For the purpose of illustrating the invention, there is shown in the drawings, embodiments which are present preferred. It should be understood, however, that the present invention is not limited to the precise arrangements and instrumentality shown in the attached drawings.

DETAILED DESCRIPTION OF THE INVENTION

Figure 1:
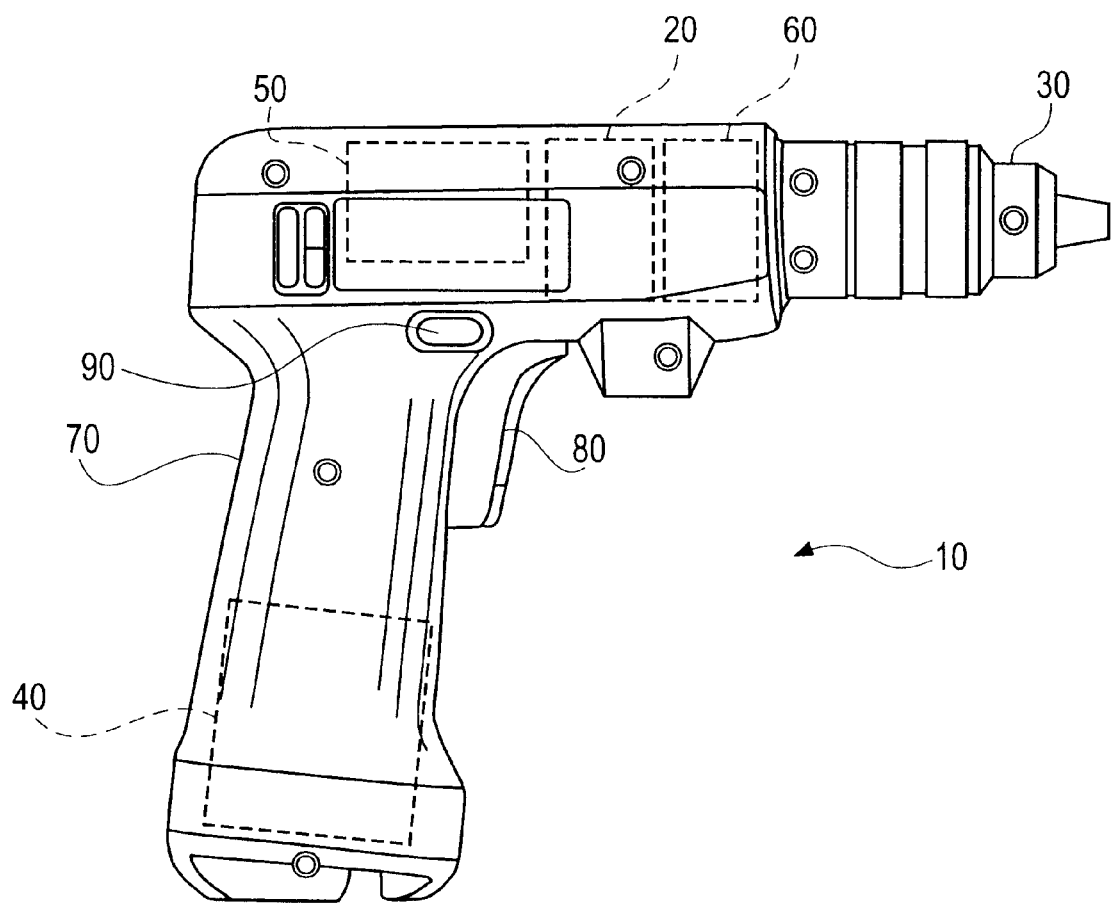
FIG. 1 illustrates a power tool formed according to one embodiment of the present invention.

FIG. 1 illustrates an electric power tool 10 with a body 70, a trigger 80, a forward/reverse control 90, a variable speed motor 20, a chuck 30 for holding a tool, a DC battery 40, a drive shaft 60 and a control system 50 for driving the motor 20. The motor 20 of the tool 10 is adapted to drive the chuck 30 through the shaft 60. The trigger 80 allows the user to vary the speed of the chuck 30 by controlling the current delivered from the battery 40 to the motor 20 based on how much the user squeezes the trigger 80.

Figure 2:
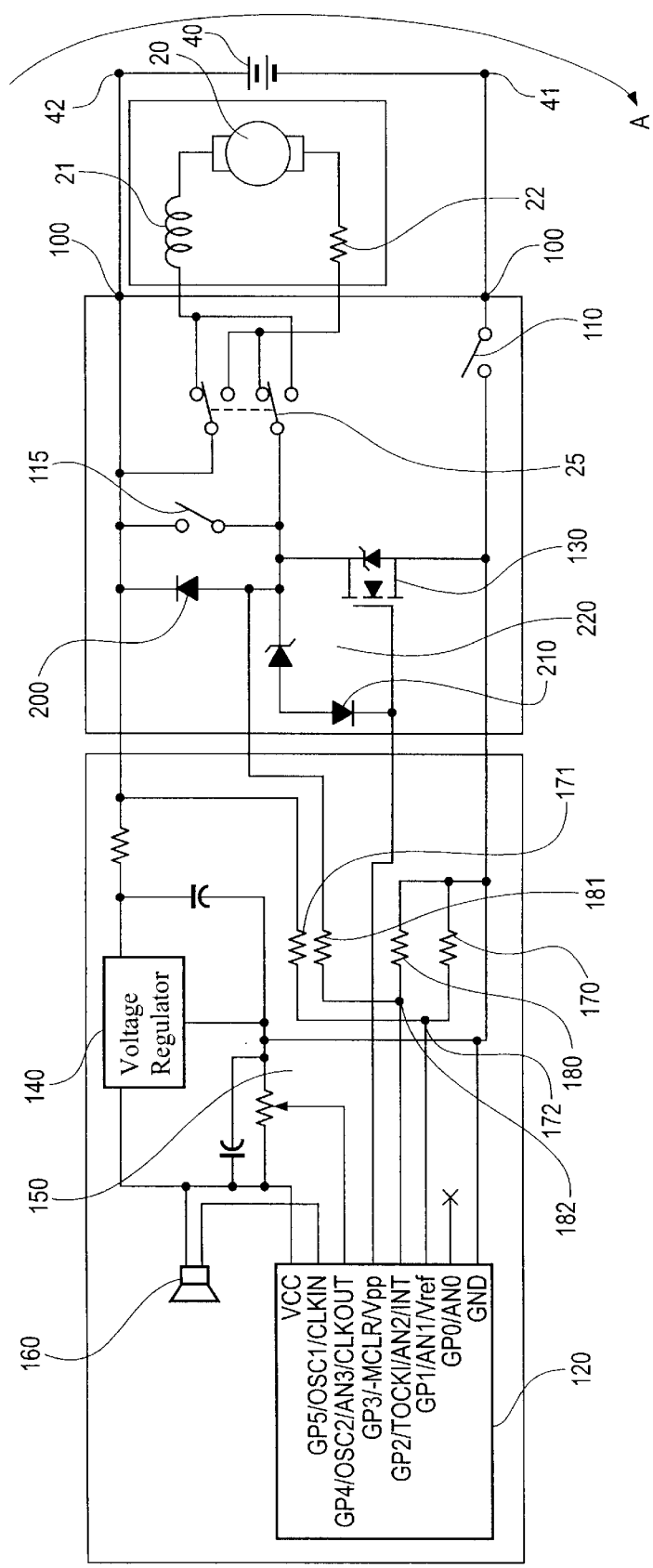
FIG. 2 illustrates a schematic diagram of a control circuit according to one embodiment of the present invention.

FIG. 2 illustrates the control system 50 formed in accordance with one embodiment of the present invention. The control system 50 is connected in series with DC battery 40 and motor 20. The DC battery 40 has a positive terminal 41 and a negative terminal 42 electronically connected to the first set of contacts 100. The terminals 41 and 42 of the battery 40 are connected to a first set of contacts 100 and arranged in a series with an on-off switch 110. A brake switch 115 and a power MOSFET 130 are arranged in series with one another and are connected across the contacts 100 and the battery 40.

A voltage regulator 140 include an input connected through one contact 100 to one terminal of the battery 40. An output of the voltage regulator 140 is connected to a power input terminal VCC on a microprocessor 120. The voltage regulator 140 regulates the voltage delivered to the microprocessor 120. The voltage regulator 140 also includes a ground terminal GND that is connected to one end of a potentiometer 150. An opposite end of the potentiometer 150 is connected to the input terminal VCC of the microprocessor 120. A center tap on the potentiometer 150 is connected to a reference input terminal GP 4 on the microprocessor 120 to monitor the output voltage of the voltage regulator 140. The microprocessor 120 is connected to an audio output 160.

A first voltage divider 170, 171 is provided between the terminals of the battery 40. A center tap 172 of the voltage divider 170, 171 is connected to an input terminal GP1 of the microprocessor 120 to monitor the voltage potential across the battery 40. A second voltage divider 180, 181 is provided across the terminals of the power MOSFET 130. A center tap 182 of the voltage divider 180, 181 is connected to an input terminal GP2 of the microprocessor 120 to monitor the voltage potential across the power MOSFET 130. Optionally, an AC power source may be used with an AC to DC converter to deliver a DC power to the first set of contacts.

The control system 50 determines the duty cycle and/or frequency of the motor 20 when the user squeezes the trigger 80. The on-off switch 110 is controlled by the trigger 80 and is opened when the trigger 80 is released and closed when the trigger 80 is squeezed. Optionally, the on-off switch 110 may also be opened and closed based on a button located proximate the trigger 80 to afford added sofets. The DC battery 40 is attached to, and disconnected from the motor 20 by the on-off switch 110. The inductance and resistance of the motor 20 are schematically modeled in FIG. 2 as coil inductance 21 and coil resistance 22. The motor 20 also includes a forward/reverse switch 25 that allows the user to switch the direction of the tool through a forward reverse control 90. When the user completely releases the trigger 80 the on-off switch 110 is opened and the brake switch 115 is closed. When the brake switch 115 closes, it creates a short circuit across the terminals of the motor 20. When on-off switch 110 is opened, power is no longer delivered to the motor 20. However, the motor 20 continues to rotate and thus function as a generator. While the motor 20 operates as a generator, it produces current that is short circuited by the brake switch 115. The short circuit inhibits current flow from the motor 20 which in turn causes the magnetic fields created by the windings to interfere with the magnetic fields of the surrounding permanent magnets, thereby inducing a braking force onto the drive shaft 60 and chuck 30.

The control system also includes a fly wheel diode 200 which is electrically connected to the motor 20. When current passes through the inductor 21, yet the power MOSFET 130 is turned off, the current is dissipated through the flywheel diode 200. Two diodes 210, 220 may also be provided that prevent the power MOSFET 130 from turning off too quickly.

The power MOSFET 130 and microprocessor 120 are electrically connected to the control system. The microprocessor 120 cycles the power MOSFET 130 on and off to generate a PWM current/voltage to the motor 20. The microprocessor 120 may be a commercially available microprocessor such as an eight pin microprocessor. The microprocessor 120 may be larger or smaller depending on the number of components or features of the tool 10.

The control system 50 contains two voltage divider networks 170–172 and 180–182 that sense the voltage of electrical components of the tool. One voltage divider network 180–182 is electrically connected to the battery 40, senses the voltage across the battery 40 and provides the battery voltage to the microprocessor 120. Another voltage divider network 170–172 is electrically connected to the power MOSFET 130, senses the voltage across the MOSFET 130 and provides the voltage across the power MOSFET 130 to the microprocessor 120.

The control system 50 contains two voltage divider networks 170–172 and 180–182 that sense the voltage of electrical components of the tool. One voltage divider network 170–172 is electrically connected to the battery 40, senses the voltage across the battery 40 and provides the battery voltage to the microprocessor 120. Another voltage divider network 180–182 is electrically connected to the power MOSFET 130, senses the voltage across the MOSFET 130 and provides the voltage across the power MOSFET 130 to the microprocessor 120.

In operation, when the user presses the trigger 80, the on-off switch 110 is closed and current flows from the battery 40 to the motor 20 (along and in the direction of path A). The microprocessor 120 determines the desired duty cycle based on the trigger 80 position. The microprocessor 120 monitors the voltage across the battery 40 and the power MOSFET 130 and determines if the desired duty cycle (based on the user input) exceeds a maximum safe output.

If the microprocessor 120 determines that the desired output is within a safe range then the actual duty cycle will be the desired duty cycle selected by the user. The control system 50 sends a PWM current/voltage signal to the motor 20 in accordance with the user selected duty cycle and the motor 20 drives the drive shaft 60 which turns the chuck 30. If, however, the microprocessor 120 determines that the desired duty cycle is outside safe operating parameters, the microprocessor 120 will adjust the duty cycle to limit or eliminate damage to the battery 40, motor 20 or power MOSFET 130. After the microprocessor 120 determines a duty cycle within a safe operating range, the microprocessor 120 supplies a PWM current/voltage to the motor 20 by cycling the power MOSFET 130 on and off. When the user completely releases the trigger 80 the on-off switch 110 is opened.

By way of example only, the user may squeeze the trigger 80 to indicate a desire that the drive shaft 60 spin at 75% of its maximum rotation capacity. However, the microprocessor 120 may determine that a duty cycle associated with a drive shaft 60 rotational speed of 75% of the maximum speed is either not attainable or not desirable given the present condition of the battery 40, present forces being induced on the drive shaft 60, demands presently being placed on the motor 20 and power MOSFET 130, and other considerations. Based upon these inputs, the microprocessor 120 may determine that a lower duty cycle associated with a rotation speed of less than 75% may be preferable. Accordingly, the microprocessor 120 may, by way of example only, drive the power MOSFET 130 to deliver a PWM current/voltage to the motor 20 only affording a rotation speed of approximately 50% of the maximum rotation speed for the drive shaft 60.

The control system monitors and limits excessive currents being applied to the motor 20, battery 40, and other electrical components of the tool. The control system may also monitor a decreasing charge on the battery 40 and prevent discharging of the battery 40 below a certain level.

The microprocessor 120 monitors the battery 40 voltage and the voltage across the power MOSFET 130 through the voltage dividers 170–172 and 180–182. These inputs allow the microprocessor 120 to determine the condition of the battery 40 and the current applied to the motor 20. For example, the microprocessor 120 can detect excessive currents across the motor 20, the battery 40 and other electrical components. When the microprocessor 120 detects an excessive current across the motor 20, power MOSFET 130 or other electrical component, the duty cycle can be lower and thereby lowering the current to an acceptable level. The microprocessor 120 can also detect decreasing voltage in the battery 40. When the microprocessor 120 detects a low voltage situation across the battery 40, the microprocessor 120 can lower the duty cycle to reduce the voltage drain on the battery 40.

The control system 50 also monitors the electrical conditions of the tool to determine if the tool 10 has stalled. Once the microprocessor 120 determines that the tool 10 is stalled it switches to a "ratchet mode" and changes the frequency at which the drive signal is supplied to the motor 20. By changing the frequency of the drive signal, the control system maximizes the available current and increases the tools ability to eliminate the stalled condition.

For example, if the user squeezes the trigger 80 and the microprocessor 120 determines that a 50% duty cycle should be applied. The power MOSFET 130 is turning on and off in a pulse with modulation and is supplying current to the motor 20 50% of the time. When the power MOSFET 130 is on it is drawing a high current from the battery 40, therefore the voltage across the MOSFET 130 is increasing and the voltage across the battery 40 is decreasing. This situation indicates that the tool is pulling a high current. Then in the next half cycle, the MOSFET 130 is turned off. If the motor 20 is not rotating, that is if there is no voltage generated across the motor 20, then this situation indicates the motor 20 is in a stalled condition. When the microprocessor 120 detects a stalled motor 20 condition the microprocessor 120 will switch the tool 10 into a ratchet mode. In the ratchet mode, the microprocessor 120 changes the frequency at which current is supplied to the motor 20. Stated another way, when in the ratchet mode, the microprocessor 120 lengthens the period or duty cycle. For example, during normal operation, the frequency may be 10 kHz which corresponds to a period of 0.1 milliseconds. During the ratchet mode, the frequency may be lowered to 1 Hz which corresponds to a period or duty cycle of 1 second.

By changing the frequency of the current to the motor 20 to a lower frequency, short high current bursts are delivered to the motor 20. The ratchet mode operation reduces the amount of voltage drained from the battery 40. The ratchet mode also increases the ability of the tool to eliminate the stalled motor 20 condition. In one embodiment, the microprocessor can be set to wait a predetermined number of cycles after the microprocessor 120 senses a stalled condition before the microprocessor 120 will switch into the ratchet mode.

Figure 3:
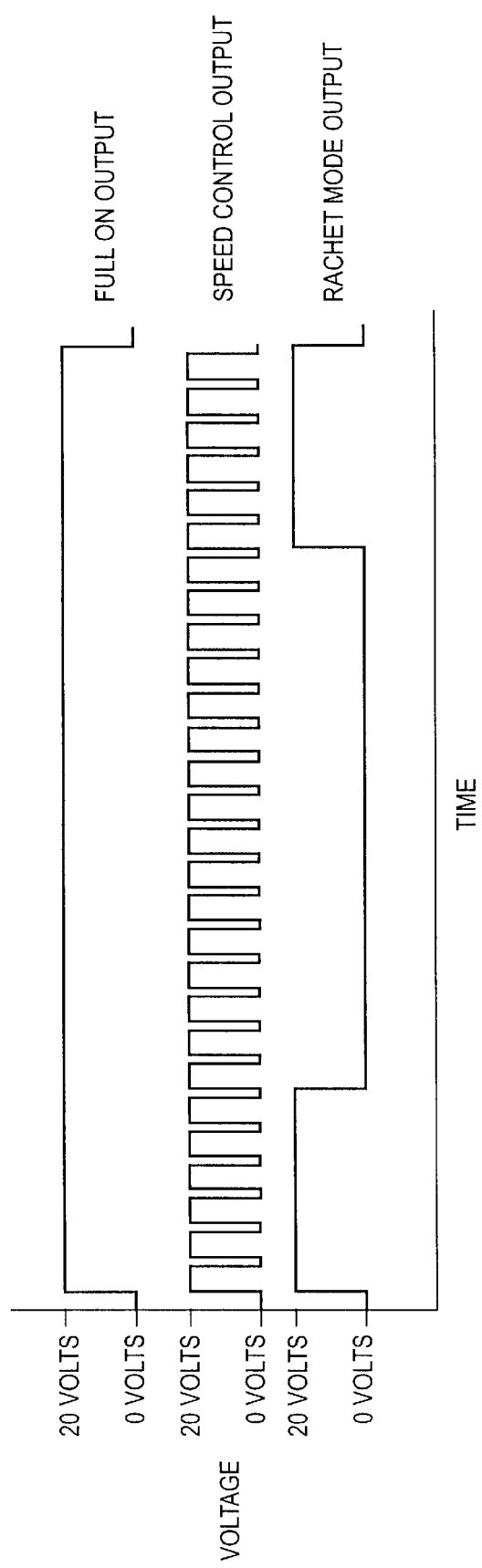
FIG. 3 is a graph of applied voltage versus time for different power tools and preferred embodiments of the present invention.

FIG. 3 illustrates a series of graphs of voltages versus time for a) a tool only having on/off states, b) a tool controlled with PWM, and c) a tool controlled in a ratchet mode. As shown in FIG. 3, a tool operated in a ratchet mode delivers longer pulses at the on voltage to the motor, followed by longer periods of a zero or low voltage state.

Optionally, other components or measurements can be monitored to determine if the duty cycle or frequency (i.e., ratchet mode) of the tool should be adjusted by the microprocessor 120. For example, the speed of the motor 20 could be monitored by the microprocessor 120. Additionally, the speaker 160 may be used to indicate when either the duty cycle has been adjusted, when the tool is in ratchet mode, or when the battery 40 or another component needs to be changed.

Optionally, control system 50 may be used in other types of power tools, such as screw drivers, saws, and others.

While the invention has been described with reference to a preferred embodiment, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A control system for driving a power tool, comprising:
   a power source;
   a motor adapted to drive a shaft;
   a power switching unit interconnecting said power source and said motor, said power switching unit applying a pulse width modulated (PWM) drive signal from said power source to said motor; and
   a controller monitoring at least one electrical characteristic of said power source, and adjusting an operating duty cycle of said PWM drive signal based on said electrical characteristic.

2. The control system of claim 1, wherein said electrical characteristic is voltage.

3. The control system of claim 1, wherein said electrical characteristic is current.

4. The control system of claim 1, wherein said controller detects a voltage drop across said power source.

5. The control system of claim 1, wherein said controller detects a voltage drop across said power source and said motor.

6. The control system of claim 1, wherein said power switching unit comprises a power MOSFET connected in series between said power source and said motor, said power MOSFET switching between ON and OFF states to vary the pulse width of said PWM drive signal.

7. The control system of claim 1 further comprising an input lead connected to said controller providing a user trigger signal indicative of a trigger position.

8. The control system of claim 1 further comprising an input lead connected to said controller providing a user trigger signal indicative of a position of a user desired motor speed.

9. The control system of claim 1, wherein the PWM drive signal adjusts the motor speed.

10. The control system of claim 1, further comprising a voltage sensor monitoring a voltage drop across of said power source. 11. The control system of claim 1 wherein said controller determines a target duty cycle representative of a target motor condition selected by a user and setting said operating duty cycle below said target duty cycle.

11. The control system of claim 1 wherein said controller determines a target duty cycle representative of a target motor condition selected by a user and setting said operating duty cycle below said target duty cycle.

12. The control system of claim 1 wherein said controller determines a target duty cycle representative of a target motor condition selected by a user and setting said operating duty cycle at a value not equal to said target duty cycle.

13. The control system of claim 12 wherein said target motor condition constitutes motor speed.

14. The control system of claim 12 wherein said target motor condition constitutes torque.

15. The control system of claim 12 wherein said operating duty cycle is set from the peak current and time period over which said power source delivers a current at or near the peak current.

16. A power tool comprising:
   a chuck holding a tool;
   a motor driving said chuck;
   a power source;
   a power switching unit interconnecting said power source and said motor, said power switching unit applying a pulse width modulated (PWM) drive signal from said power source to said motor; and
   a controller monitoring at least one electrical characteristic of said power source, and adjusting an operating duty cycle of said PWM drive signal based on said electrical characteristic.

17. The power tool of claim 16, wherein said controller detects a voltage drop across said power source.

18. The power tool of claim 16, wherein said controller detects a voltage drop across said power source and said motor.

19. The power tool of claim 16, wherein said power switching unit comprises a power MOSFET connected in series between said power source and said motor, said power MOSFET switching between ON and OFF states to vary the pulse width of said PWM drive signal.

20. The power tool of claim 16 further comprising an input lead connected to said controller providing a user trigger signal indicative of a trigger position.

21. The power tool of claim 16 further comprising an input lead connected to said controller providing a user trigger signal indicative of a position of a user desired motor speed.

22. The power tool of claim 16, wherein the PWM drive signal adjusts the motor speed.

23. The power tool of claim 16, further comprising a voltage sensor monitoring a voltage drop across said power source.

24. The power tool of claim 16 wherein said controller determines a target duty cycle representative of a target motor condition selected by a user and setting said operating duty cycle below said target duty cycle.

25. The power tool of claim 16 wherein said controller determines a target duty cycle representative of a target motor condition selected by a user and setting said operating duty cycle at a value not equal to said target duty cycle.

26. The power tool of claim 25 wherein said target motor condition constitutes motor speed.

27. The power tool of claim 25 wherein said target motor condition constitutes torque.

28. The power tool of claim 25 wherein said operating duty cycle is set from the peak current and time period over which said power source delivers a current at or near the peak current.

29. A control system for driving a power tool comprising:
   a power source;
   a motor adapted to drive a shaft;
   a power switching unit interconnecting said power source and said motor, said power switching unit applying a drive signal from said power source to said motor; and
   a controller monitoring at least one electrical characteristic of said power source and said power switching unit and adjusting an operating frequency of said drive signal to enter a ratchet mode based on monitored electrical characteristics of said power source and power switching unit.

30. The control system of claim 16 wherein said controller enters said ratchet mode upon detecting a decrease in a voltage potential across said power source and an increase in a voltage potential across said power switching unit, representative of a motor state drawing high current.

31. The control system of claim 16 wherein said controller enters said ratchet mode upon detecting an increase in a voltage potential across said power source and a decrease in a voltage potential across said power switching unit, representative of a stalled motor state.

32. The control system of claim 29, wherein said power switching unit comprises a power MOSFET connected in series between said power source and said motor.

33. The control system of claim 29, wherein said electrical characteristic is voltage.

34. The control system of claim 29, wherein said electrical characteristic is current.

35. The control system of claim 29, wherein said controller detects a voltage drop across said power source.

36. The control system of claim 29, wherein said controller detects a voltage drop across said power source and said motor.

37. The control system of claim 29 further comprising an input lead connected to said controller providing a user trigger signal indicative of a trigger position.

38. The control system of claim 29 further comprising an input lead connected to said controller providing a user trigger signal indicative of a position of a user desired motor speed.

39. The control system of claim 29, further comprising a voltage sensor monitoring a voltage drop across at least one of said power source and said controller.

40. A control system for driving a power tool comprising:
   a power source;
   a motor adapted to drive a shaft;
   a power switching unit interconnecting said power source and said motor, said power switching unit applying a drive signal from said power source to said motor; and
   a controller monitoring at least one electrical characteristic of said power source, and adjusting a frequency of said drive signal based on said electrical characteristic of said power source.

41. A control system of claim 26 wherein said electrical characteristic includes a maximum current delivered by said power source and a time period over which said maximum current is deliverable.

* * * * *